(12) United States Patent
Choi et al.

(10) Patent No.: US 11,758,165 B2
(45) Date of Patent: Sep. 12, 2023

(54) METHOD FOR IDENTIFICATION OF RANDOM ACCESS POINT AND PICTURE TYPES

(71) Applicant: TENCENT AMERICA LLC, Palo Alto, CA (US)

(72) Inventors: Byeongdoo Choi, Palo Alto, CA (US); Stephan Wenger, Hillsborough, CA (US); Shan Liu, San Jose, CA (US)

(73) Assignee: TENCENT AMERICA LLC, Palo Alto, CA (US)

( * ) Notice: Subject to any disclaimer, the term of this patent is extended or adjusted under 35 U.S.C. 154(b) by 219 days.

(21) Appl. No.: 17/223,455

(22) Filed: Apr. 6, 2021

(65) Prior Publication Data

US 2021/0227239 A1    Jul. 22, 2021

Related U.S. Application Data

(63) Continuation of application No. 16/541,693, filed on Aug. 15, 2019, now Pat. No. 10,999,590.

(60) Provisional application No. 62/786,306, filed on Dec. 28, 2018.

(51) Int. Cl.
  *H04N 19/44*    (2014.01)
  *H04N 19/169*   (2014.01)
  *H04N 19/46*    (2014.01)

(52) U.S. Cl.
  CPC .......... *H04N 19/44* (2014.11); *H04N 19/188* (2014.11); *H04N 19/46* (2014.11)

(58) Field of Classification Search
  CPC ....... H04N 19/44; H04N 19/188; H04N 19/46
  See application file for complete search history.

(56) References Cited

U.S. PATENT DOCUMENTS

2013/0272618 A1* 10/2013 Deshpande .......... H04N 19/159
                                                    382/232
2014/0098868 A1    4/2014 Wang
2015/0016546 A1    1/2015 Wang et al.
(Continued)

FOREIGN PATENT DOCUMENTS

CA      2897152 A1    7/2014

OTHER PUBLICATIONS

International Search Report dated Mar. 17, 2020 from the International Bureau in application No. PCT/US19/68540.
(Continued)

*Primary Examiner* — Rowina J Cattungal
(74) *Attorney, Agent, or Firm* — Sughrue Mion, PLLC

(57) ABSTRACT

An approach for reconstructing a current Network Abstraction Layer (NAL) unit for video decoding using at least one processor includes determining the current NAL unit to be an Intra Random Access Picture (IRAP) NAL unit; determining whether a previous NAL unit decoded immediately before the current NAL unit indicates an end of a coded video sequence (CVS); based on determining that the previous NAL unit indicates the end of the CVS, decoding the current NAL unit as one from among an Instantaneous Decoder Refresh (IDR) NAL unit or a Broken Link Access (BLA) NAL unit; and based on determining that the previous NAL unit does not indicate the end of the CVS, decoding the current NAL unit as a Clean Random Access (CRA) NAL unit, and reconstructing the decoded current NAL unit.

20 Claims, 10 Drawing Sheets

(56) References Cited

U.S. PATENT DOCUMENTS

| | | | |
|---|---|---|---|
| 2015/0373345 A1 | 12/2015 | Ramasubramonian et al. | |
| 2016/0316211 A1 | 10/2016 | Sychev et al. | |
| 2017/0180744 A1* | 6/2017 | Deshpande | H04N 19/70 |
| 2017/0339421 A1 | 11/2017 | Wang | |
| 2018/0376154 A1* | 12/2018 | Deshpande | H04N 19/184 |
| 2019/0058895 A1 | 2/2019 | Deshpande | |
| 2020/0204806 A1* | 6/2020 | Jin | H04N 19/132 |

OTHER PUBLICATIONS

Written Opinion dated Mar. 17, 2020 from the International Bureau in application No. PCT/US19/68540.

* cited by examiner

FIG. 1

| nal_unit( NumBytesInNALunit ) { | C | Descriptor |
|---|---|---|
| forbidden_zero_bit | All | f(1) |
| nal_ref_idc | All | u(2) |
| nal_unit_type | All | u(5) |
| ... | | |
| } | | |

| | C | Descriptor |
|---|---|---|
| nal_unit( NumBytesInNALunit ) { | | |
|   forbidden_zero_bit | All | f(1) |
|   nal_ref_idc | All | u(2) |
|   nal_unit_type | All | u(5) |
|   nal_picture_id | All | u(8) |
|   ... | | |

601 — nal_unit( NumBytesInNALunit ){
602 — nal_unit_type
603 — Descriptor column

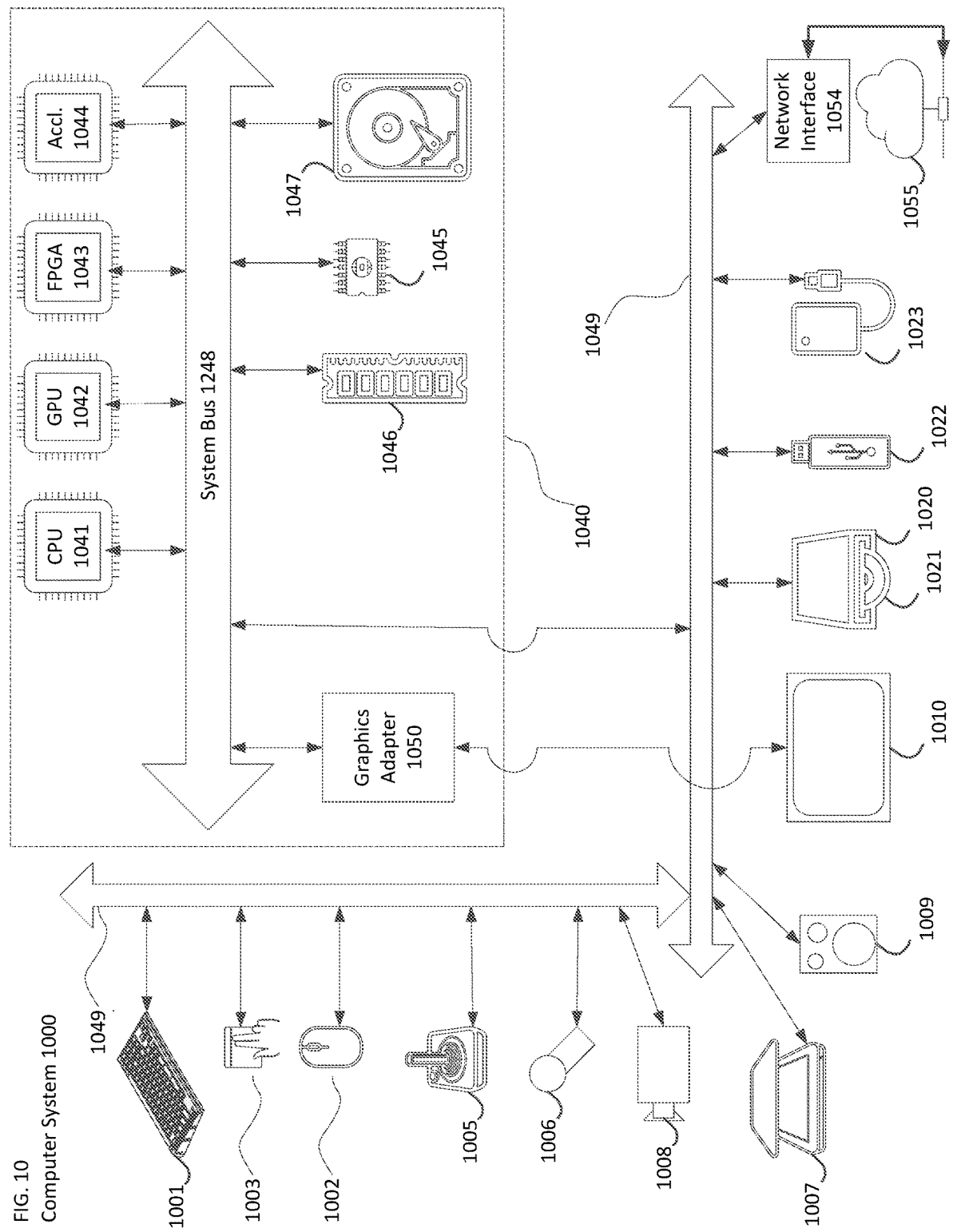

METHOD FOR IDENTIFICATION OF RANDOM ACCESS POINT AND PICTURE TYPES

CROSS-REFERENCE TO RELATED APPLICATION

This application is a continuation of U.S. patent application Ser. No. 16/541,693, filed on Aug. 15, 2019, in the United States Patent & Trademark Office, which claims priority from 35 U.S.C. § 119 to U.S. Provisional Application No. 62/786,306, filed on Dec. 28, 2018, in the United States Patent & Trademark Office, the disclosures of which are incorporated herein by reference in their entireties.

FIELD

The disclosed subject matter relates to video coding and decoding, and more specifically, to the inclusion of a picture reference in a fixed-length codepoint, high level syntax structure such as the Network Abstraction Layer unit header.

BACKGROUND

Examples of video coding and decoding using inter-picture prediction with motion compensation have been known for decades. Uncompressed digital video can consist of a series of pictures, each picture having a spatial dimension of, for example, 1920×1080 luminance samples and associated chrominance samples. The series of pictures can have a fixed or variable picture rate, which may also be known as frame rate, of, for example 60 pictures per second or 60 Hz. Uncompressed video has significant bitrate requirements. For example, 1080p60 4:2:0 video at 8 bit per sample (1920×1080 luminance sample resolution at 60 Hz frame rate) requires close to 1.5 Gbit/s bandwidth. An hour of such video requires more than 600 GByte of storage space.

One purpose of video coding and decoding can be the reduction of redundancy in the input video signal, through compression. Compression can help reducing aforementioned bandwidth or storage space requirements, in some cases by two orders of magnitude or more. Both lossless and lossy compression, as well as a combination thereof can be employed. Lossless compression refers to techniques where an exact copy of the original signal can be reconstructed from the compressed original signal. When using lossy compression, the reconstructed signal may not be identical to the original signal, but the distortion between original and reconstructed signal is small enough to make the reconstructed signal useful for the intended application. In the case of video, lossy compression is widely employed. The amount of distortion tolerated depends on the application; for example, users of certain consumer streaming applications may tolerate higher distortion than users of television contribution applications. The compression ratio achievable can reflect that: higher allowable/tolerable distortion can yield higher compression ratios.

A video encoder and decoder can utilize techniques from several broad categories, including, for example, motion compensation, transform, quantization, and entropy coding, some of which will be introduced below.

Examples of dividing a coded video bitstream into packets for transportation over packet networks have been in use for decades. Early on, video coding standards and technologies were in their majority optimized for bot-oriented transport, and defined bitstreams. Packetization occurred in system layer interfaces specified, for example, in Real-time Transport Protocol (RTP-) payload formats. With the advent of Internet connectivity suitable for mass-use of video over the Internet, the video coding standards reflected that prominent use case through the conceptual differentiation of a video coding layer (VCL) and a network abstraction layer (NAL). NAL units were introduced in H.264 in 2003, and have been retained in certain video coding standards and technologies since then with only slight modifications.

A NAL unit can, in many cases, be seen as the smallest entity on which a decoder can act upon without necessarily having decoded all preceding NAL units of a coded video sequence. Insofar, NAL units enable certain error resilience technologies as well as certain bitstream manipulation techniques, to include bitstream pruning, by Media Aware Network Elements (MANEs) such as Selective Forwarding Units (SFUs) or Multipoint Control Units (MCUs).

FIG. 1 depicts relevant parts of the syntax diagram of NAL unit headers in accordance with H.264 (101) and H.265 (102), in both cases without any of their respective extensions. In both cases, the forbidden_zero_bit is a zero bit used for start code emulation prevention in certain system layer environments. The nal_unit_type syntax element refers to the type of data a NAL unit carries, which can be, for example, one of certain slice types, parameter set types, Supplementary Enhancement Information (SEI-) message, and so on. The H.265 NAL unit header further comprises nuh_layer_id and nuh_temporal_id_plus1, which indicate the spatial/SNR and temporal layer of a coded picture the NAL unit belongs to.

It can be observed that the NAL unit header includes only easily parseable fixed length codewords, that do not have any parsing dependency to other data in the bitstream such as, for example, other NAL unit headers, parameter sets, and so on. As NAL unit headers are the first octets in a NAL unit, MANEs can easily extract them, parse them, and act on them. Other high level syntax elements, for example slice or tile headers, in contrast, are less easily accessible to MANEs as they may require keeping parameter set context and/or the processing of variable length or arithmetically coded codepoints.

It can further be observed that the NAL unit headers as shown in FIG. 1 do not include information that can associate a NAL unit to a coded picture that is composed of a plurality of NAL units (such as, for example, comprising multiple tiles or slices, at least some of which being packetized in individual NAL units).

Certain transport technologies such as RTP (RFC 3550), MPEG-system standards, ISO file formats, and so on, may include certain information, often in the form of timing information such as presentation time, in the example of MPEG and ISO file format, or capture time, in the example of RTP, that can be easily accessible by MANEs and can help associating their respective transport units with coded pictures. However, the semantics of these information can differ from one transport/storage technology to another, and may have no direct relationship with the picture structure used in the video coding. Accordingly, these information may be, at best, heuristics and may also not be particularly well suited to identify whether or not NAL units in a NAL unit stream belong to the same coded picture.

SUMMARY

In an embodiment, there is provided a method of reconstructing a current Network Abstraction Layer (NAL) unit for video decoding using at least one processor, the method including determining the current NAL unit to be an Intra Random Access Picture (IRAP) NAL unit; determining whether a previous NAL unit decoded immediately before the current NAL unit indicates an end of a coded video sequence (CVS); based on determining that the previous NAL unit indicates the end of the CVS, decoding the current NAL unit as one from among an Instantaneous Decoder Refresh (IDR) NAL unit or a Broken Link Access (BLA) NAL unit; and based on determining that the previous NAL unit does not indicate the end of the CVS, decoding the current NAL unit as a Clean Random Access (CRA) NAL unit, and reconstructing the decoded current NAL unit.

In an embodiment, there is provided a device for reconstructing a current Network Abstraction Layer (NAL) unit for video decoding, the device including at least one memory configured to store program code; and at least one processor configured to read the program code and operate as instructed by the program code, the program code including: first determining code configured to cause the at least one processor to determine the current NAL unit to be an Intra Random Access Picture (IRAP) NAL unit; second determining code configured to cause the processor to determine whether a previous NAL unit decoded immediately before the current NAL unit indicates an end of a coded video sequence (CVS); first decoding code configured to cause the at least one processor to, based on determining that the previous NAL unit indicates the end of the CVS, decode the current NAL unit as one from among an Instantaneous Decoder Refresh (IDR) NAL unit or a Broken Link Access (BLA) NAL unit; and second decoding code configured to cause the at least one processor to, based on determining that the previous NAL unit does not indicate the end of the CVS, decoding the current NAL unit as a Clean Random Access (CRA) NAL unit, and reconstructing code configured to cause the processor to reconstruct the decoded current NAL unit.

In an embodiment, there is provided a non-transitory computer-readable medium storing instructions, the instructions including: one or more instructions that, when executed by one or more processors of a device for reconstructing a current Network Abstraction Layer (NAL) unit for video decoding, cause the one or more processors to determine the current NAL unit to be an Intra Random Access Picture (IRAP) NAL unit determine whether a previous NAL unit decoded immediately before the current NAL unit indicates an end of a coded video sequence (CVS); based on determining that the previous NAL unit indicates the end of the CVS, decode the current NAL unit as one from among an Instantaneous Decoder Refresh (IDR) NAL unit or a Broken Link Access (BLA) NAL unit; and based on determining that the previous NAL unit does not indicate the end of the CVS, decode the current NAL unit as a Clean Random Access (CRA) NAL unit, and reconstruct the decoded current NAL unit.

BRIEF DESCRIPTION OF THE DRAWINGS

Further features, the nature, and various advantages of the disclosed subject matter will be more apparent from the following detailed description and the accompanying drawings in which:

FIG. 1 is a schematic illustration of NAL Unit Headers in accordance with H.264 and H.265.

FIG. 6 is a schematic illustration of a NAL Unit Header in accordance with an embodiment.

FIG. 10 is a schematic illustration of a computer system in accordance with an embodiment.

PROBLEM TO BE SOLVED

Existing video coding syntax lacks easily identifiable/parseable syntax elements identifying random access points, random access picture types, and leading picture types in high level syntax structures such as NAL unit headers.

DETAILED DESCRIPTION

Figure 2:
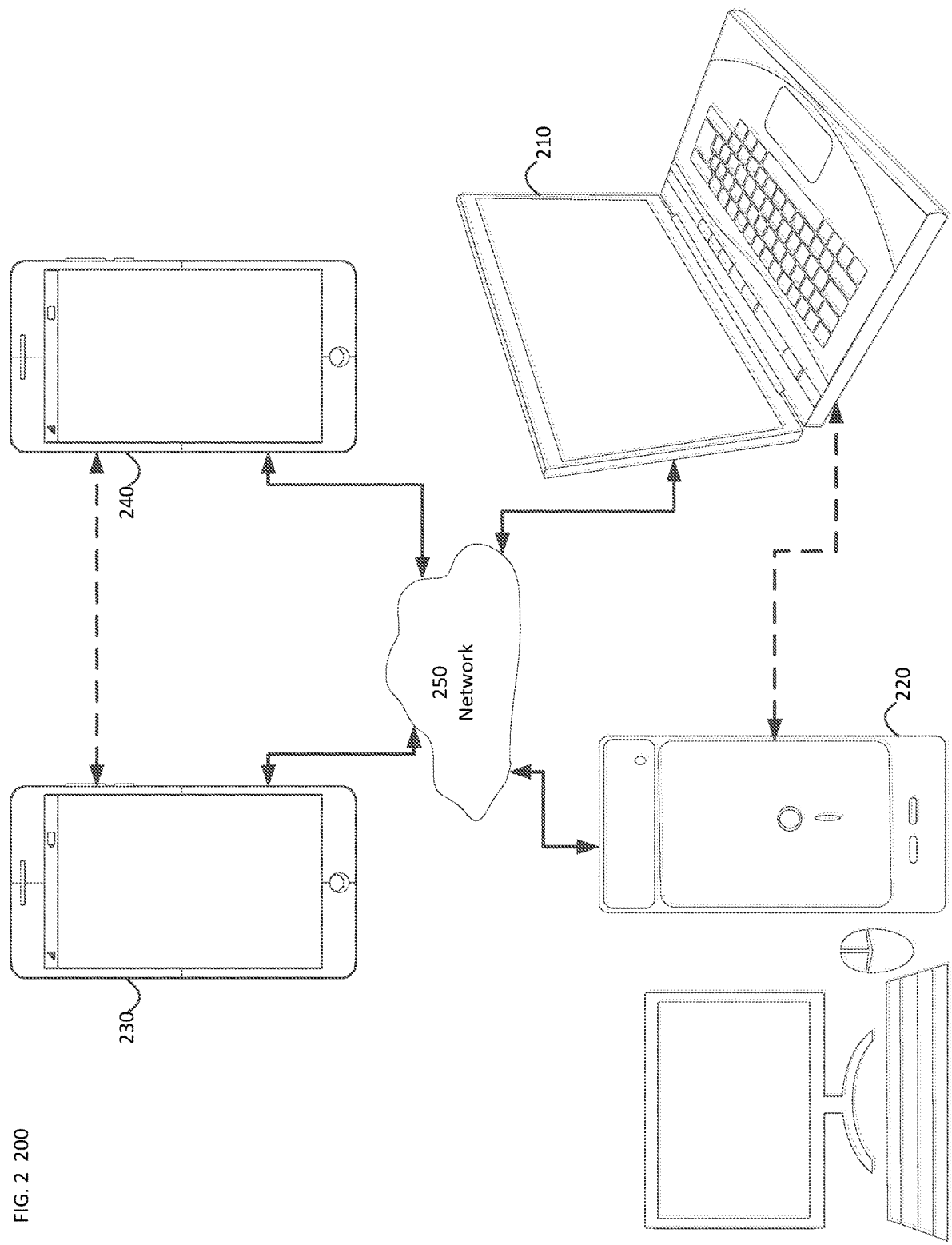
FIG. 2 is a schematic illustration of a simplified block diagram of a communication system in accordance with an embodiment.

FIG. 2 illustrates a simplified block diagram of a communication system (200) according to an embodiment of the present disclosure. The system (200) may include at least two terminals (210-220) interconnected via a network (250). For unidirectional transmission of data, a first terminal (210) may code video data at a local location for transmission to the other terminal (220) via the network (250). The second terminal (220) may receive the coded video data of the other terminal from the network (250), decode the coded data and display the recovered video data. Unidirectional data transmission may be common in media serving applications and the like.

FIG. 2 illustrates a second pair of terminals (230, 240) provided to support bidirectional transmission of coded video that may occur, for example, during videoconferencing. For bidirectional transmission of data, each terminal (230, 240) may code video data captured at a local location for transmission to the other terminal via the network (250). Each terminal (230, 240) also may receive the coded video data transmitted by the other terminal, may decode the coded data and may display the recovered video data at a local display device.

In FIG. 2, the terminals (210-240) may be illustrated as servers, personal computers and smart phones but the principles of the present disclosure may be not so limited. Embodiments of the present disclosure find application with laptop computers, tablet computers, media players and/or dedicated video conferencing equipment. The network (250) represents any number of networks that convey coded video data among the terminals (210-240), including for example wireline and/or wireless communication networks. The communication network (250) may exchange data in circuit-switched and/or packet-switched channels. Representative networks include telecommunications networks, local area networks, wide area networks and/or the Internet. For the purposes of the present discussion, the architecture and topology of the network (250) may be immaterial to the operation of the present disclosure unless explained herein below.

Figure 3:
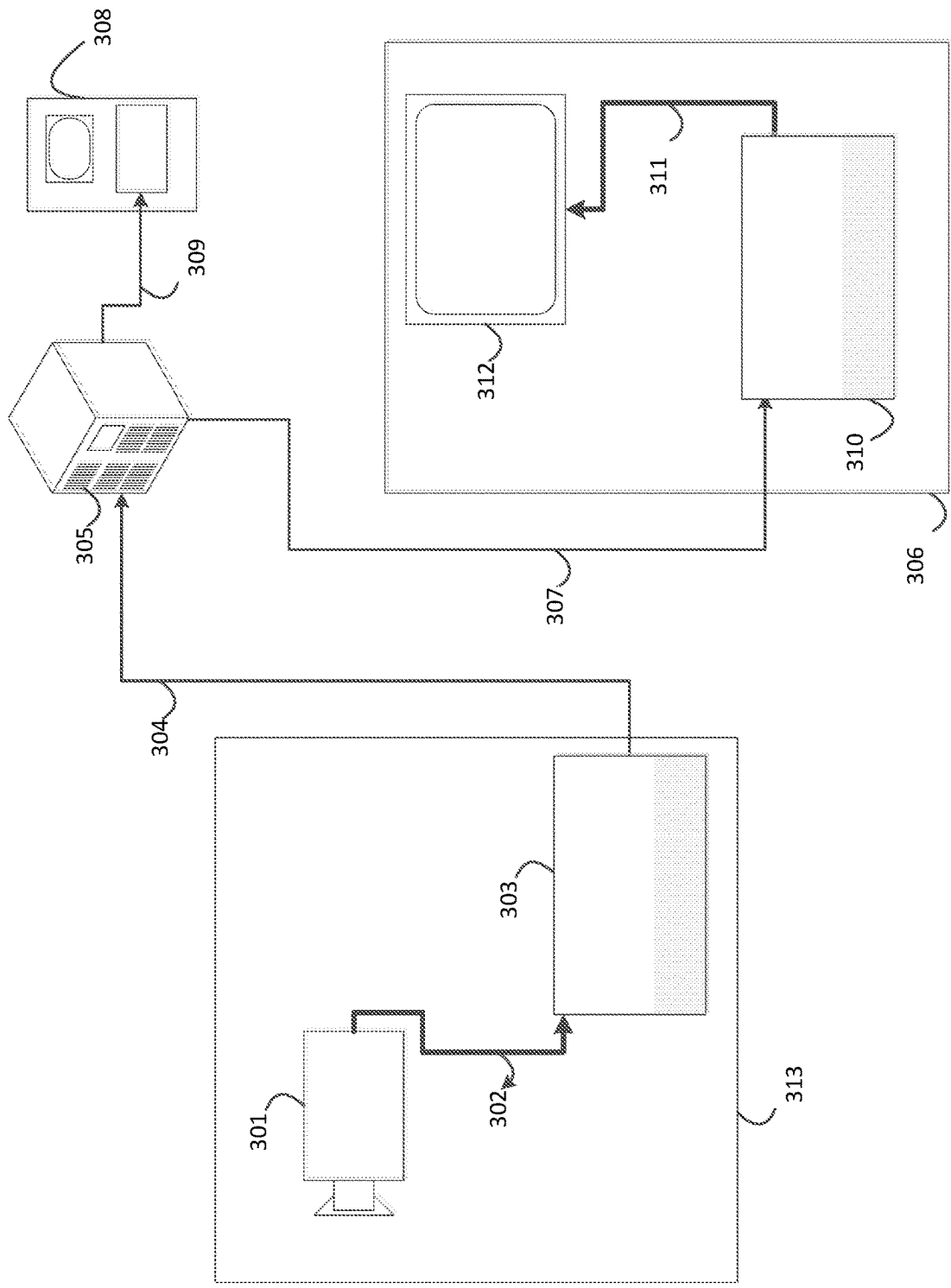
FIG. 3 is a schematic illustration of a simplified block diagram of a communication system in accordance with an embodiment.

FIG. 3 illustrates, as an example for an application for the disclosed subject matter, the placement of a video encoder and decoder in a streaming environment. The disclosed subject matter can be equally applicable to other video enabled applications, including, for example, video conferencing, digital TV, storing of compressed video on digital media including CD, DVD, memory stick and the like, and so on.

A streaming system may include a capture subsystem (313), that can include a video source (301), for example a digital camera, creating a for example uncompressed video sample stream (302). That sample stream (302), depicted as a bold line to emphasize a high data volume when compared to encoded video bitstreams, can be processed by an encoder (303) coupled to the camera (301). The encoder (303) can include hardware, software, or a combination thereof to enable or implement aspects of the disclosed subject matter as described in more detail below. The encoded video bitstream (304), depicted as a thin line to emphasize the lower data volume when compared to the sample stream, can be stored on a streaming server (305) for future use. One or more streaming clients (306, 308) can access the streaming server (305) to retrieve copies (307, 309) of the encoded video bitstream (304). A client (306) can include a video decoder (310) which decodes the incoming copy of the encoded video bitstream (307) and creates an outgoing video sample stream (311) that can be rendered on a display (312) or other rendering device (not depicted). In some streaming systems, the video bitstreams (304, 307, 309) can be encoded according to certain video coding/compression standards. Examples of those standards include ITU-T Recommendation H.265. Under development is a video coding standard informally known as Versatile Video Coding or VVC. The disclosed subject matter may be used in the context of VVC.

Figure 4:
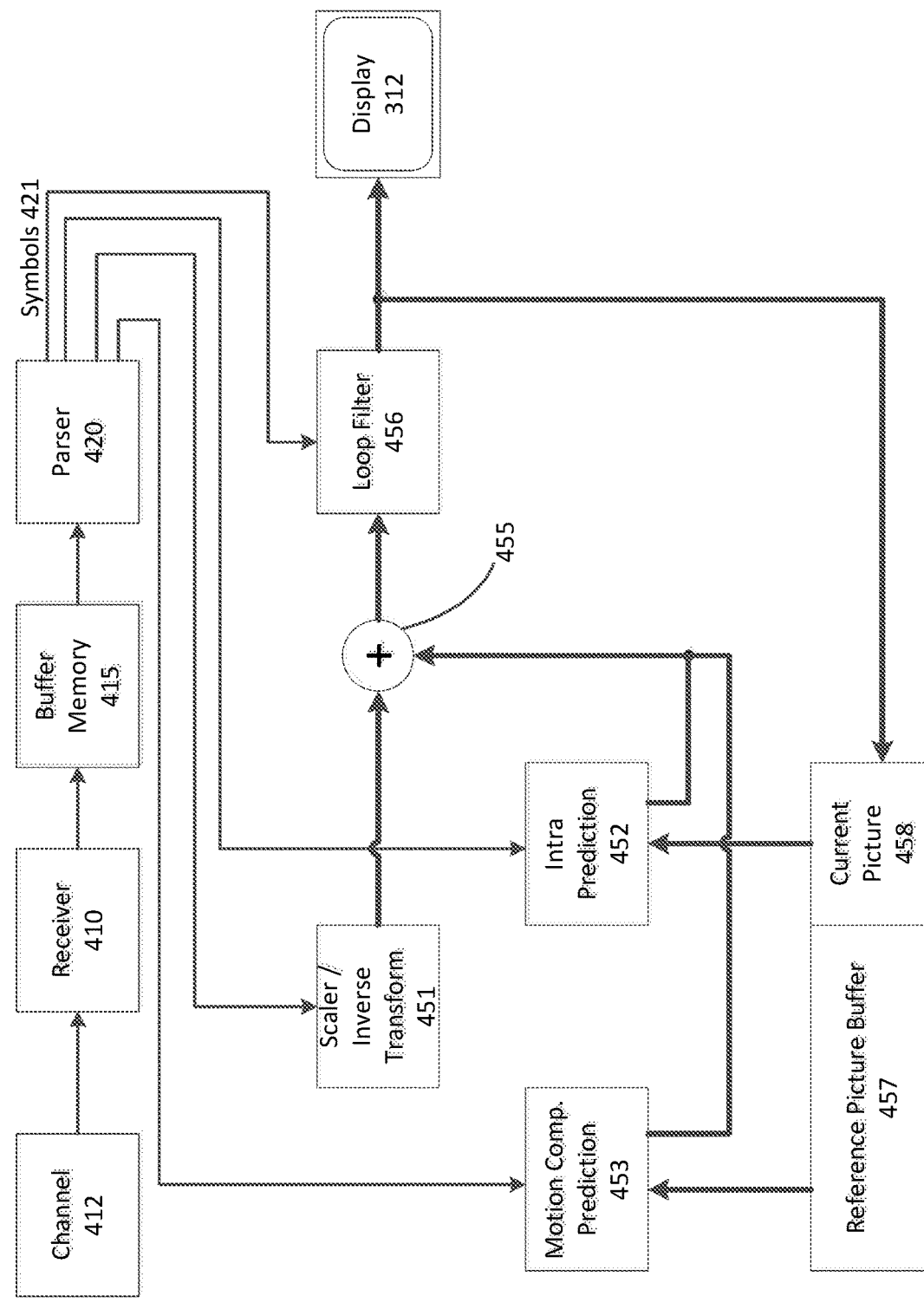
FIG. 4 is a schematic illustration of a simplified block diagram of a decoder in accordance with an embodiment.

FIG. 4 may be a functional block diagram of a video decoder (310) according to an embodiment of the present disclosure.

A receiver (410) may receive one or more codec video sequences to be decoded by the decoder (310); in the same or another embodiment, one coded video sequence at a time, where the decoding of each coded video sequence is independent from other coded video sequences.

The coded video sequence may be received from a channel (412), which may be a hardware/software link to a storage device which stores the encoded video data. The receiver (410) may receive the encoded video data with other data, for example, coded audio data and/or ancillary data streams, that may be forwarded to their respective using entities (not depicted). The receiver (410) may separate the coded video sequence from the other data. To combat network jitter, a buffer memory (415) may be coupled in between receiver (410) and entropy decoder/parser (420) ("parser" henceforth). When receiver (410) is receiving data from a store/forward device of sufficient bandwidth and controllability, or from an isosychronous network, the buffer (415) may not be needed, or can be small. For use on best effort packet networks such as the Internet, the buffer (415) may be required, can be comparatively large and can advantageously of adaptive size.

The video decoder (310) may include an parser (420) to reconstruct symbols (421) from the entropy coded video sequence. Categories of those symbols include information used to manage operation of the decoder (310), and potentially information to control a rendering device such as a display (312) that is not an integral part of the decoder but can be coupled to it, as was shown in FIG. 3. The control information for the rendering device(s) may be in the form of Supplementary Enhancement Information (SEI messages) or Video Usability Information (VUI) parameter set fragments (not depicted). The parser (420) may parse/entropy-decode the coded video sequence received. The coding of the coded video sequence can be in accordance with a video coding technology or standard, and can follow principles well known to a person skilled in the art, including variable length coding, Huffman coding, arithmetic coding with or without context sensitivity, and so forth. The parser (420) may extract from the coded video sequence, a set of subgroup parameters for at least one of the subgroups of pixels in the video decoder, based upon at least one parameters corresponding to the group. Subgroups can include Groups of Pictures (GOPs), pictures, tiles, slices, macroblocks, Coding Units (CUs), blocks, Transform Units (TUs), Prediction Units (PUs) and so forth. The entropy decoder/parser may also extract from the coded video sequence information such as transform coefficients, quantizer parameter values, motion vectors, and so forth.

The parser (420) may perform entropy decoding/parsing operation on the video sequence received from the buffer (415), so to create symbols (421).

Reconstruction of the symbols (421) can involve multiple different units depending on the type of the coded video picture or parts thereof (such as: inter and intra picture, inter and intra block), and other factors. Which units are involved, and how, can be controlled by the subgroup control information that was parsed from the coded video sequence by the parser (420). The flow of such subgroup control information between the parser (420) and the multiple units below is not depicted for clarity.

Beyond the functional blocks already mentioned, decoder 310 can be conceptually subdivided into a number of functional units as described below. In a practical implementation operating under commercial constraints, many of these units interact closely with each other and can, at least partly, be integrated into each other. However, for the purpose of describing the disclosed subject matter, the conceptual subdivision into the functional units below is appropriate.

A first unit is the scaler/inverse transform unit (451). The scaler/inverse transform unit (451) receives quantized transform coefficient as well as control information, including which transform to use, block size, quantization factor, quantization scaling matrices, etc. as symbol(s) (421) from the parser (420). It can output blocks comprising sample values, that can be input into aggregator (455).

In some cases, the output samples of the scaler/inverse transform (451) can pertain to an intra coded block; that is: a block that is not using predictive information from previously reconstructed pictures, but can use predictive information from previously reconstructed parts of the current picture. Such predictive information can be provided by an intra picture prediction unit (452). In some cases, the intra picture prediction unit (452) generates a block of the same size and shape of the block under reconstruction, using surrounding already reconstructed information fetched from the current (partly reconstructed) picture (458). The aggregator (455), in some cases, adds, on a per sample basis, the prediction information the intra prediction unit (452) has generated to the output sample information as provided by the scaler/inverse transform unit (451).

In other cases, the output samples of the scaler/inverse transform unit (451) can pertain to an inter coded, and potentially motion compensated block. In such a case, a Motion Compensation Prediction unit (453) can access reference picture memory (457) to fetch samples used for prediction. After motion compensating the fetched samples in accordance with the symbols (421) pertaining to the block, these samples can be added by the aggregator (455) to the output of the scaler/inverse transform unit (in this case called the residual samples or residual signal) so to generate output sample information. The addresses within the reference picture memory form where the motion compensation unit fetches prediction samples can be controlled by motion vectors, available to the motion compensation unit in the form of symbols (421) that can have, for example X, Y, and reference picture components. Motion compensation also can include interpolation of sample values as fetched from the reference picture memory when sub-sample exact motion vectors are in use, motion vector prediction mechanisms, and so forth.

The output samples of the aggregator (455) can be subject to various loop filtering techniques in the loop filter unit (456). Video compression technologies can include in-loop filter technologies that are controlled by parameters included in the coded video bitstream and made available to the loop filter unit (456) as symbols (421) from the parser (420), but can also be responsive to meta-information obtained during the decoding of previous (in decoding order) parts of the coded picture or coded video sequence, as well as responsive to previously reconstructed and loop-filtered sample values.

The output of the loop filter unit (456) can be a sample stream that can be output to the render device (312) as well as stored in the reference picture memory for use in future inter-picture prediction.

Certain coded pictures, once fully reconstructed, can be used as reference pictures for future prediction. Once a coded picture is fully reconstructed and the coded picture has been identified as a reference picture (by, for example, parser (420)), the current reference picture (458) can become part of the reference picture buffer (457), and a fresh current picture memory can be reallocated before commencing the reconstruction of the following coded picture.

The video decoder 420 may perform decoding operations according to a predetermined video compression technology that may be documented in a standard, such as ITU-T Rec. H.265. The coded video sequence may conform to a syntax specified by the video compression technology or standard being used, in the sense that it adheres to the syntax of the video compression technology or standard, as specified in the video compression technology document or standard and specifically in the profiles document therein. Also necessary for compliance can be that the complexity of the coded video sequence is within bounds as defined by the level of the video compression technology or standard. In some cases, levels restrict the maximum picture size, maximum frame rate, maximum reconstruction sample rate (measured in, for example megasamples per second), maximum reference picture size, and so on. Limits set by levels can, in some cases, be further restricted through Hypothetical Reference Decoder (HRD) specifications and metadata for HRD buffer management signaled in the coded video sequence.

In an embodiment, the receiver (410) may receive additional (redundant) data with the encoded video. The additional data may be included as part of the coded video sequence(s). The additional data may be used by the video decoder (420) to properly decode the data and/or to more accurately reconstruct the original video data. Additional data can be in the form of, for example, temporal, spatial, or SNR enhancement layers, redundant slices, redundant pictures, forward error correction codes, and so on.

Figure 5:
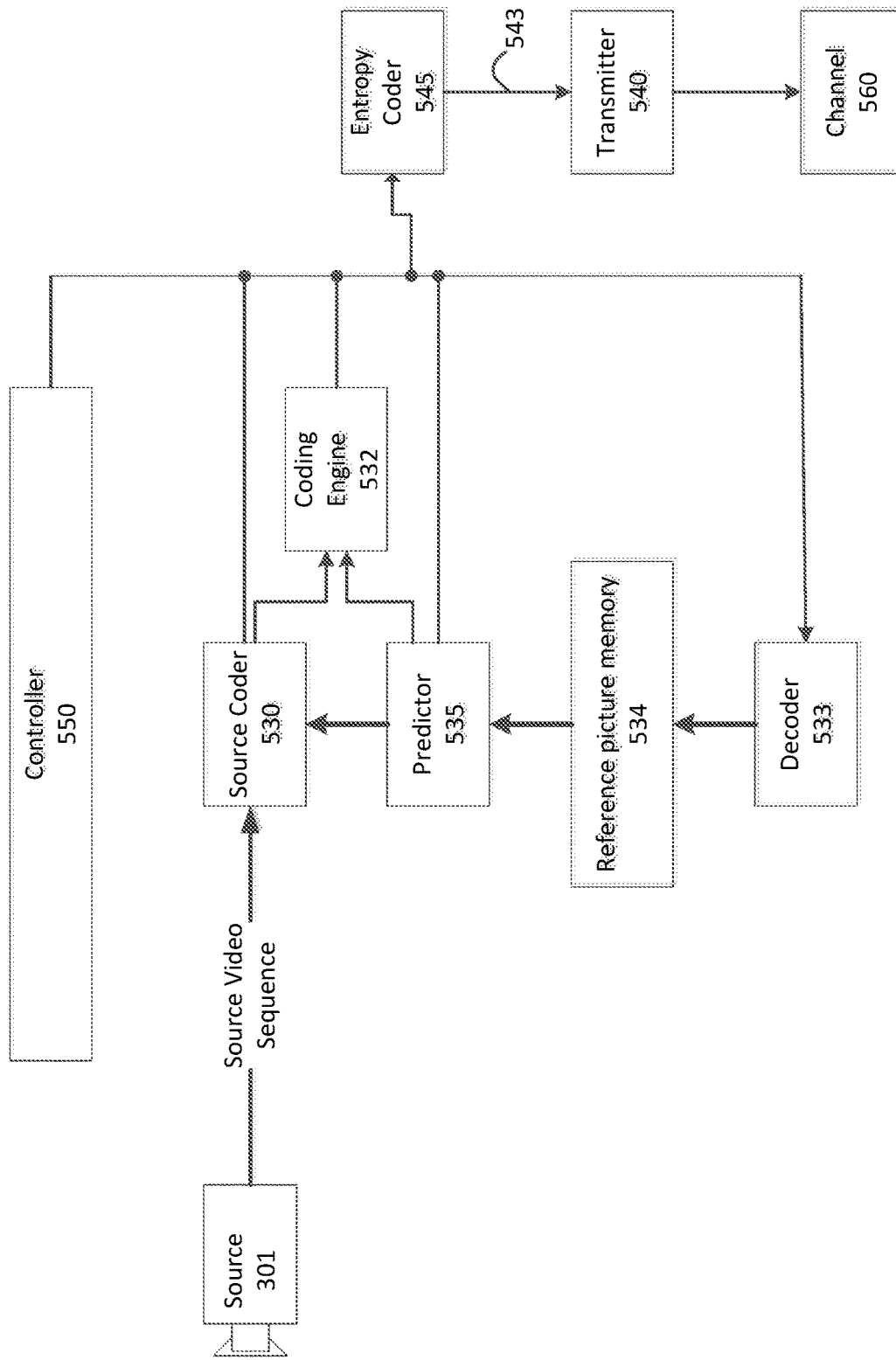
FIG. 5 is a schematic illustration of a simplified block diagram of an encoder in accordance with an embodiment.

FIG. 5 may be a functional block diagram of a video encoder (303) according to an embodiment of the present disclosure.

The encoder (303) may receive video samples from a video source (301) (that is not part of the encoder) that may capture video image(s) to be coded by the encoder (303).

The video source (301) may provide the source video sequence to be coded by the encoder (303) in the form of a digital video sample stream that can be of any suitable bit depth (for example: 8 bit, 10 bit, 12 bit, . . . ), any colorspace (for example, BT.601 Y CrCB, RGB, . . . ) and any suitable sampling structure (for example Y CrCb 4:2:0, Y CrCb 4:4:4). In a media serving system, the video source (301) may be a storage device storing previously prepared video. In a videoconferencing system, the video source (303) may be a camera that captures local image information as a video sequence. Video data may be provided as a plurality of individual pictures that impart motion when viewed in sequence. The pictures themselves may be organized as a spatial array of pixels, wherein each pixel can comprise one or more sample depending on the sampling structure, color space, etc. in use. A person skilled in the art can readily understand the relationship between pixels and samples. The description below focusses on samples.

According to an embodiment, the encoder (303) may code and compress the pictures of the source video sequence into a coded video sequence (543) in real time or under any other time constraints as required by the application. Enforcing appropriate coding speed is one function of Controller (550). Controller controls other functional units as described below and is functionally coupled to these units. The coupling is not depicted for clarity. Parameters set by controller can include rate control related parameters (picture skip, quantizer, lambda value of rate-distortion optimization techniques, . . . ), picture size, group of pictures (GOP) layout, maximum motion vector search range, and so forth. A person skilled in the art can readily identify other functions of controller (550) as they may pertain to video encoder (303) optimized for a certain system design.

Some video encoders operate in what a person skilled in the are readily recognizes as a "coding loop". As an over-simplified description, a coding loop can consist of the encoding part of an encoder (530) ("source coder" henceforth) (responsible for creating symbols based on an input picture to be coded, and a reference picture(s)), and a (local) decoder (533) embedded in the encoder (303) that reconstructs the symbols to create the sample data a (remote) decoder also would create (as any compression between symbols and coded video bitstream is lossless in the video compression technologies considered in the disclosed subject matter). That reconstructed sample stream is input to the reference picture memory (534). As the decoding of a symbol stream leads to bit-exact results independent of decoder location (local or remote), the reference picture buffer content is also bit exact between local encoder and remote encoder. In other words, the prediction part of an encoder "sees" as reference picture samples exactly the same sample values as a decoder would "see" when using prediction during decoding. This fundamental principle of reference picture synchronicity (and resulting drift, if synchronicity cannot be maintained, for example because of channel errors) is well known to a person skilled in the art.

The operation of the "local" decoder (533) can be the same as of a "remote" decoder (310), which has already been described in detail above in conjunction with FIG. 4. Briefly referring also to FIG. 4, however, as symbols are available and en/decoding of symbols to a coded video sequence by entropy coder (545) and parser (420) can be lossless, the entropy decoding parts of decoder (310), including channel (412), receiver (410), buffer (415), and parser (420) may not be fully implemented in local decoder (533).

An observation that can be made at this point is that any decoder technology except the parsing/entropy decoding that is present in a decoder also necessarily needs to be present, in substantially identical functional form, in a corresponding encoder. For this reason, the disclosed subject matter focusses on decoder operation. The description of encoder technologies can be abbreviated as they are the inverse of the comprehensively described decoder technologies. Only in certain areas a more detail description is required and provided below.

As part of its operation, the source coder (530) may perform motion compensated predictive coding, which codes an input frame predictively with reference to one or more previously-coded frames from the video sequence that were designated as "reference frames." In this manner, the coding engine (532) codes differences between pixel blocks of an input frame and pixel blocks of reference frame(s) that may be selected as prediction reference(s) to the input frame.

The local video decoder (533) may decode coded video data of frames that may be designated as reference frames, based on symbols created by the source coder (530). Operations of the coding engine (532) may advantageously be lossy processes. When the coded video data may be decoded at a video decoder (not shown in FIG. 5), the reconstructed video sequence typically may be a replica of the source video sequence with some errors. The local video decoder (533) replicates decoding processes that may be performed by the video decoder on reference frames and may cause reconstructed reference frames to be stored in the reference picture cache (534). In this manner, the encoder (303) may store copies of reconstructed reference frames locally that have common content as the reconstructed reference frames that will be obtained by a far-end video decoder (absent transmission errors).

The predictor (535) may perform prediction searches for the coding engine (532). That is, for a new frame to be coded, the predictor (535) may search the reference picture memory (534) for sample data (as candidate reference pixel blocks) or certain metadata such as reference picture motion vectors, block shapes, and so on, that may serve as an appropriate prediction reference for the new pictures. The predictor (535) may operate on a sample block-by-pixel block basis to find appropriate prediction references. In some cases, as determined by search results obtained by the predictor (535), an input picture may have prediction references drawn from multiple reference pictures stored in the reference picture memory (534).

The controller (550) may manage coding operations of the video coder (530), including, for example, setting of parameters and subgroup parameters used for encoding the video data.

Output of all aforementioned functional units may be subjected to entropy coding in the entropy coder (545). The entropy coder translates the symbols as generated by the various functional units into a coded video sequence, by loss-less compressing the symbols according to technologies known to a person skilled in the art as, for example Huffman coding, variable length coding, arithmetic coding, and so forth.

The transmitter (540) may buffer the coded video sequence(s) as created by the entropy coder (545) to prepare it for transmission via a communication channel (560), which may be a hardware/software link to a storage device which would store the encoded video data. The transmitter (540) may merge coded video data from the video coder (530) with other data to be transmitted, for example, coded audio data and/or ancillary data streams (sources not shown).

The controller (550) may manage operation of the encoder (303). During coding, the controller (550) may assign to each coded picture a certain coded picture type, which may affect the coding techniques that may be applied to the respective picture. For example, pictures often may be assigned as one of the following frame types:

An Intra Picture (I picture) may be one that may be coded and decoded without using any other frame in the sequence as a source of prediction. Some video codecs allow for different types of Intra pictures, including, for example Independent Decoder Refresh Pictures. A person skilled in the art is aware of those variants of I pictures and their respective applications and features.

A Predictive picture (P picture) may be one that may be coded and decoded using intra prediction or inter prediction using at most one motion vector and reference index to predict the sample values of each block.

A Bi-directionally Predictive Picture (B Picture) may be one that may be coded and decoded using intra prediction or inter prediction using at most two motion vectors and reference indices to predict the sample values of each block. Similarly, multiple-predictive pictures can use more than two reference pictures and associated metadata for the reconstruction of a single block.

Source pictures commonly may be subdivided spatially into a plurality of sample blocks (for example, blocks of 4×4, 8×8, 4×8, or 16×16 samples each) and coded on a block-by-block basis. Blocks may be coded predictively with reference to other (already coded) blocks as determined by the coding assignment applied to the blocks' respective pictures. For example, blocks of I pictures may be coded non-predictively or they may be coded predictively with reference to already coded blocks of the same picture (spatial prediction or intra prediction). Pixel blocks of P pictures may be coded non-predictively, via spatial prediction or via temporal prediction with reference to one previously coded reference pictures. Blocks of B pictures may be coded non-predictively, via spatial prediction or via temporal prediction with reference to one or two previously coded reference pictures.

The video coder (303) may perform coding operations according to a predetermined video coding technology or standard, such as ITU-T Rec. H.265. In its operation, the video coder (303) may perform various compression operations, including predictive coding operations that exploit temporal and spatial redundancies in the input video sequence. The coded video data, therefore, may conform to a syntax specified by the video coding technology or standard being used.

In an embodiment, the transmitter (540) may transmit additional data with the encoded video. The video coder (530) may include such data as part of the coded video sequence. Additional data may comprise temporal/spatial/SNR enhancement layers, other forms of redundant data such as redundant pictures and slices, Supplementary Enhancement Information (SEI) messages, Visual Usability Information (VUI) parameter set fragments, and so on.

Figure 7:
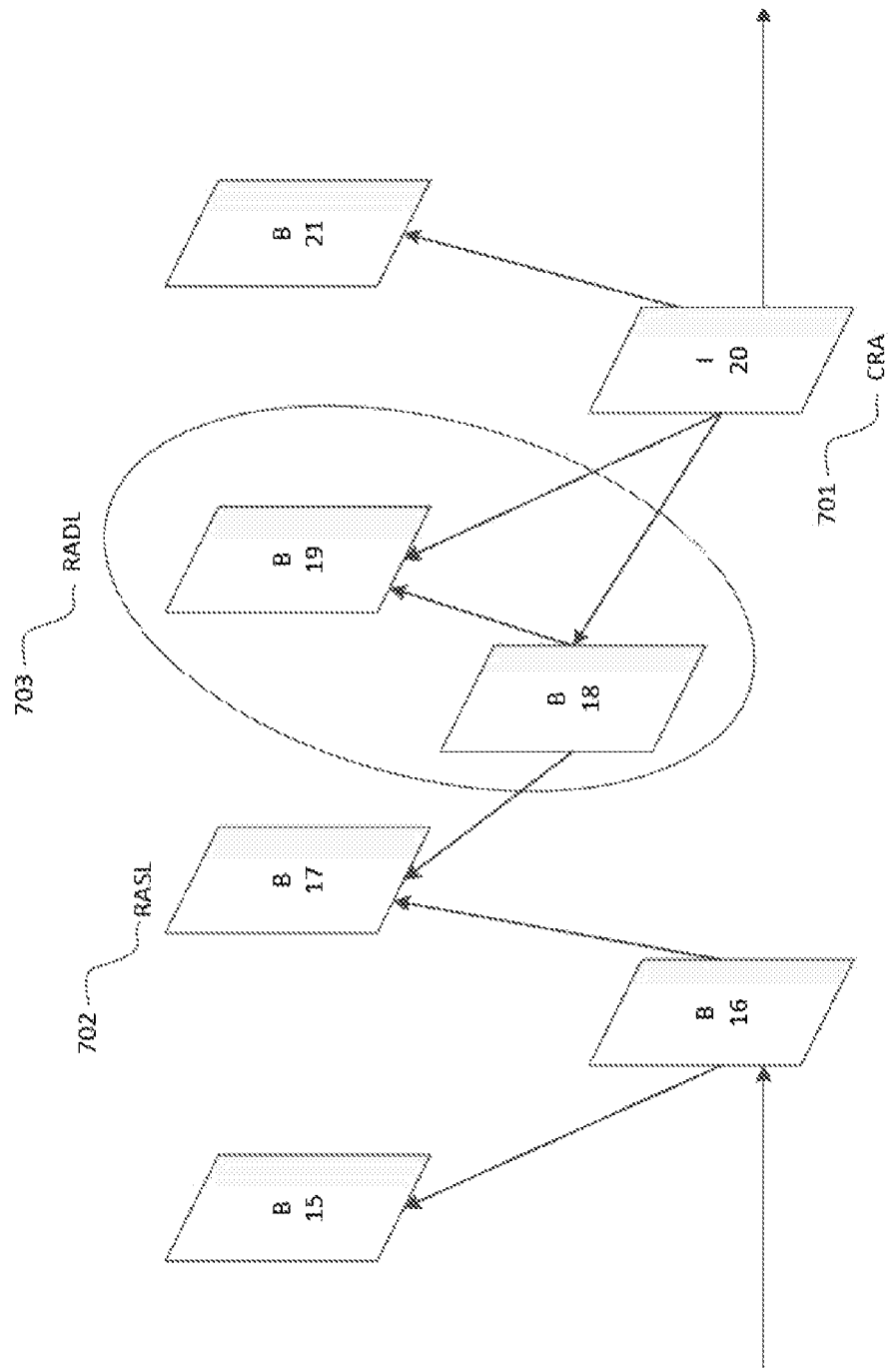
FIG. 7 is a schematic illustration of a random access point picture and leading pictures in accordance with an embodiment.

FIG. 7 depicts various types of random access mechanisms and their associated picture types. Shown are in particular Clean Random Access pictures (701), Random Access Skipped Leading pictures (702), and Random Access Decodable Leading pictures (703). Shown are also possible prediction relationships to non-random-access pictures from those various random access picture types. As an example, the RASL pictures (701) may be labeled as B15, B16, and B17, the RADL pictures 703 may be labeled as B18 and B19, and the CRA pictures 701 may be labeled as 120 and B21. In this example, the designation B may indicate a B picture, which includes motion-compensated difference information relative to previously decoded pictures, and the designation I may indicate an I picture, which is coded independently of other pictures. The number following this designation may indicate a picture order.

Instantaneous Decoding Refresh (IDR) pictures (not depicted) may be used for random access. The pictures following the IDR in decoding order may not reference the decoded pictures prior to the IDR picture. The restriction may result in lower coding efficiency.

Clean Random Access (CRA) pictures (701) may be used for random access by allowing that pictures following the CRA picture in decoding order but preceding it in output order reference pictures decoded before the CRA picture. CRA may provide better coding efficiency than IDR, because it may utilize an open GOP structure for inter-prediction. A Broken Link Access (BLA) picture (not depicted) can be a CRA picture with a broken link, which is a location in a bitstream at which it is indicated that some subsequent pictures in decoding order may contain serious visual artefacts due to unspecified operations performed in the generation of the bitstream.

Random Access Skipped Leading (RASL) picture (702) may not be correctly decoded when random access from this CRA picture occurs, because some associated reference pictures may not be present in the bitstream. Random Access Decodable Leading (RADL) picture (703) may be correctly decoded when random access from this CRA picture occurs, because RADL picture may not use any reference picture prior to the CRA picture as reference.

As described above, certain video coding technologies or standards include at least five different types of random access mechanisms and associated picture types. According to certain related art such as H.265, each of these picture types may require numbering space in the NAL Unit type field, described below. Numbering space in this field is precious and expensive in terms of coding efficiency. A reduction of the use of numbering space is, therefore, desirable from a coding efficiency viewpoint.

Referring to FIG. 6, in an embodiment, shown is an example of a NAL unit header (601). A pre-defined value of NAL unit type (602) may indicate that the current picture contained in the NAL unit is identified as a random access point picture or a leading picture. The NAL unit type value may be coded, for example, as an unsigned integer of a certain length; here 5 bits (603). A single combination of these 5 bits may be denoted as an IRAP_NUT (for IRAP Nal Unit Type) in a video compression technology or standard. The necessary numbering space in the NAL unit type field can thereby be reduced from, from example 5 entries (as in H.265) to, for example, 2 entries: one for IDR, the other for IRAP_NUT.

Figure 8:
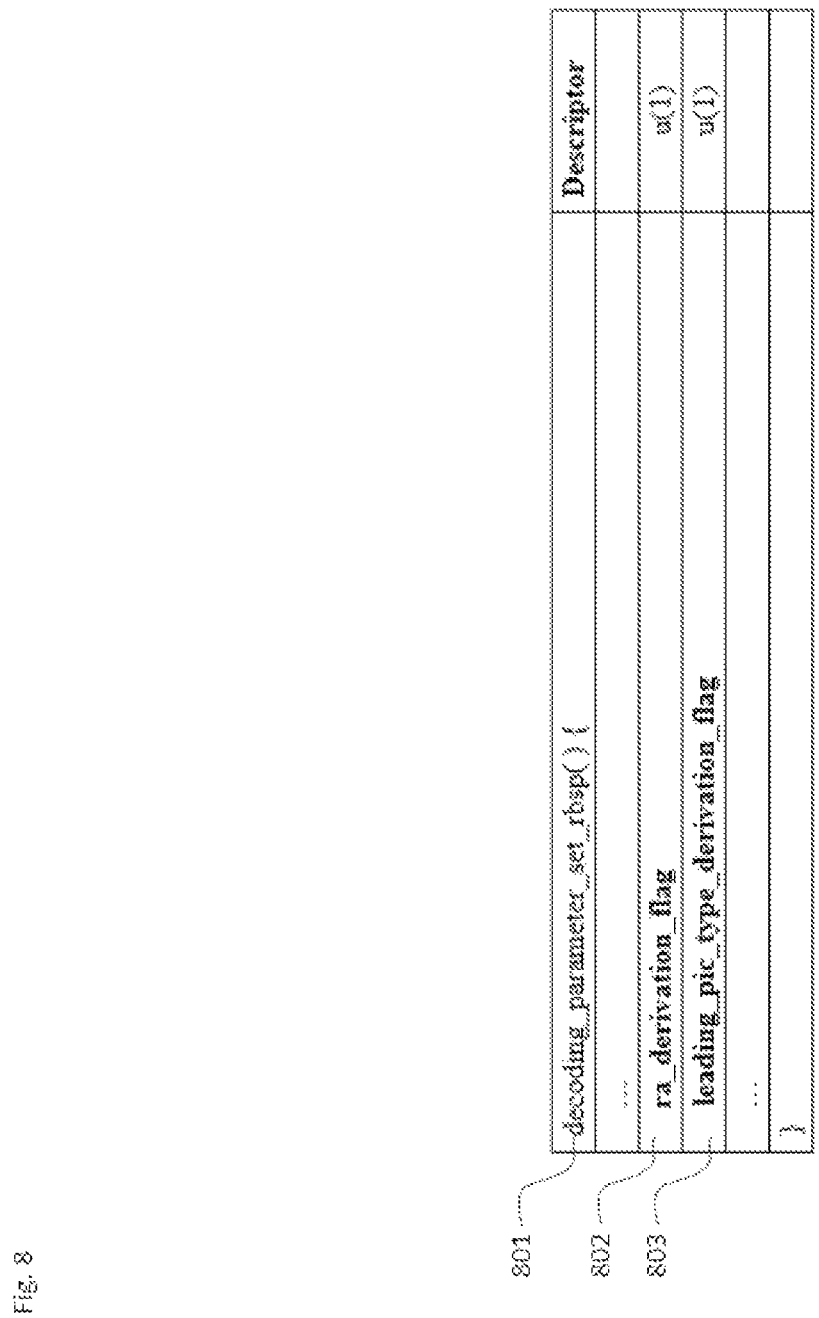
FIG. 8 is a schematic illustration of syntax elements in a parameter set in accordance with an embodiment.

Referring to FIG. 8, in an embodiment, a flag RA-derivation-flag in a suitable high level syntax structure such as sequence parameter set may indicate whether intra random access point (IRAP) type (IDR, CRA or BLA) or leading picture type (RASL or RADL) is indicated by an explicit signaling in NAL unit header, tile group header or slice header, or implicitly derived from other information including a coded video sequence start indication or picture order count (POC), as described below. As an example, the flag (802) can be included in a decoding parameter set (801) or a sequence parameter set. If the ra_derivation-flag signals implicit derivation, the NUT values can be re-used for other purposes.

In an embodiment, a flag leading_pic_type_derivation_flag (803) in a suitable high level syntax structure such as a parameter set may indicate whether a leading picture type (RASL or RADL) is explicitly identified by a flag that may be present in a suitable high level syntax structure associated with a picture or parts thereof, such as in slice header or tile group header, or implicitly identified by the associated IRAP type, Picture Order Count (POC) values or reference picture set (RPS) information.

Below, described are certain derivation/implication mechanisms that may be used when one, or both, as the case may be, of above flags signal enable, or when the above flags are not present and the values of the flags are implicitly inferred to be equal to a predefined value.

In an embodiment, if the NAL unit decoded before the IRAP NAL unit identifies the end of the coded video sequence (for example, by an EOS NAL unit), the IRAP picture (as indicated by a NAL unit with the NUT equal to IRAP_NUT) may be handled as an IDR picture or a BLA picture. If the NAL unit decoded before the IRAP NAL unit is not equivalent to the end of coded video sequence, the IRAP picture may be handled as a CRA picture. This means that there may be no need to waste a codepoint to differ between CRA and IDR/BLA, because the difference can be implied from the end of the CVS.

In an embodiment, a value of NAL unit type (e.g. IRAP_NUT) may indicate that the current picture contained in the NAL unit is identified as a leading picture. A leading picture may be decoded after the random access picture, but may be displayed before the random access picture. (not necessarily novel)

In an embodiment, a leading picture type (RASL or RADL) may be implicitly identified by interpreting the associated IRAP type. For example, if the associated IRAP type is CRA or BLA, the leading picture may be handled as a RASL picture, but if the associated IRAP type is IDR, the leading picture may be handled as a RADL. This may require the decoder to maintain state and, in particular, what IRAP picture was previously decoded In an embodiment, a leading picture type (RASL or RADL) may be indicated by an additional flag, which may be present in NAL unit header, slice header, tile group header, parameter sets or any other suitable high level syntax structure. Identification of a leading picture and its type have been identified to be necessary or useful in the following cases: (a) A bitstream starts with a CRA picture. (b) A CRA picture is random-accessed, i.e. decoding starts from a CRA picture. (c) A sequence of pictures starting with CRA picture is spliced after another sequence of coded pictures, and an EOS NAL unit is inserted in between these two sequences. (d) A file writer gets a bitstream including CRA pictures as input and authors an ISOBMFF file with sync sample indications, SAP sample grouping, and/or is_leading indications.

In an embodiment, no leading picture type is assigned in the numbering space of NUT to indicate the leading picture type. Instead, the leading picture type can be derived from the POC values between the associated IRAP picture and the following pictures in decoding order. Specifically, a non-IRAP picture, which is decoded after an IRAP picture and has a POC value smaller than the POC value of the IRAP picture, may be identified as a leading picture. A non-IRAP picture, which is decoded after an IRAP picture and has a POC value greater than the POC value of the IRAP picture, may be identified as a trailing picture.

In an embodiment, if the NAL unit decoded before the IRAP NAL unit is equivalent to the end of coded video sequence, a decoder-internal state CvsStartFlag may be set equal to 1. If CvsStartFlag is equal to 1, the IRAP picture may be handled as DR or BLA picture and all leading pictures associated with the IRAP picture may be handled as RADL pictures. If the NAL unit type of the IRAP NAL unit is equal to CRA when CvsStartFlag is equal to 1, HandleCraAsCvsStartFlag may be set equal to 1.

In an embodiment, if certain external means are available to change the decoder state without bitstream decoding so to set the variable HandleCraAsCvsStartFlag to a value for the current picture, the variable HandleCraAsCvsStartFlag may be set equal to the value provided by the external means and the variable NoIncorrectPicOutputFlag (which may be referred to as NoRaslOutputFlag) may be set equal to HandleCraAsCvsStartFlag.

In an embodiment, if the variable HandleCraAsCvsStartFlag may be equal to 1, all leading pictures associated with the CRA picture may be discarded without decoding.

In an embodiment, if the variable NoIncorrectPicOutputFlag is equal to 1, all RASL pictures associated with the CRA picture may be discarded without decoding.

Figure 9:
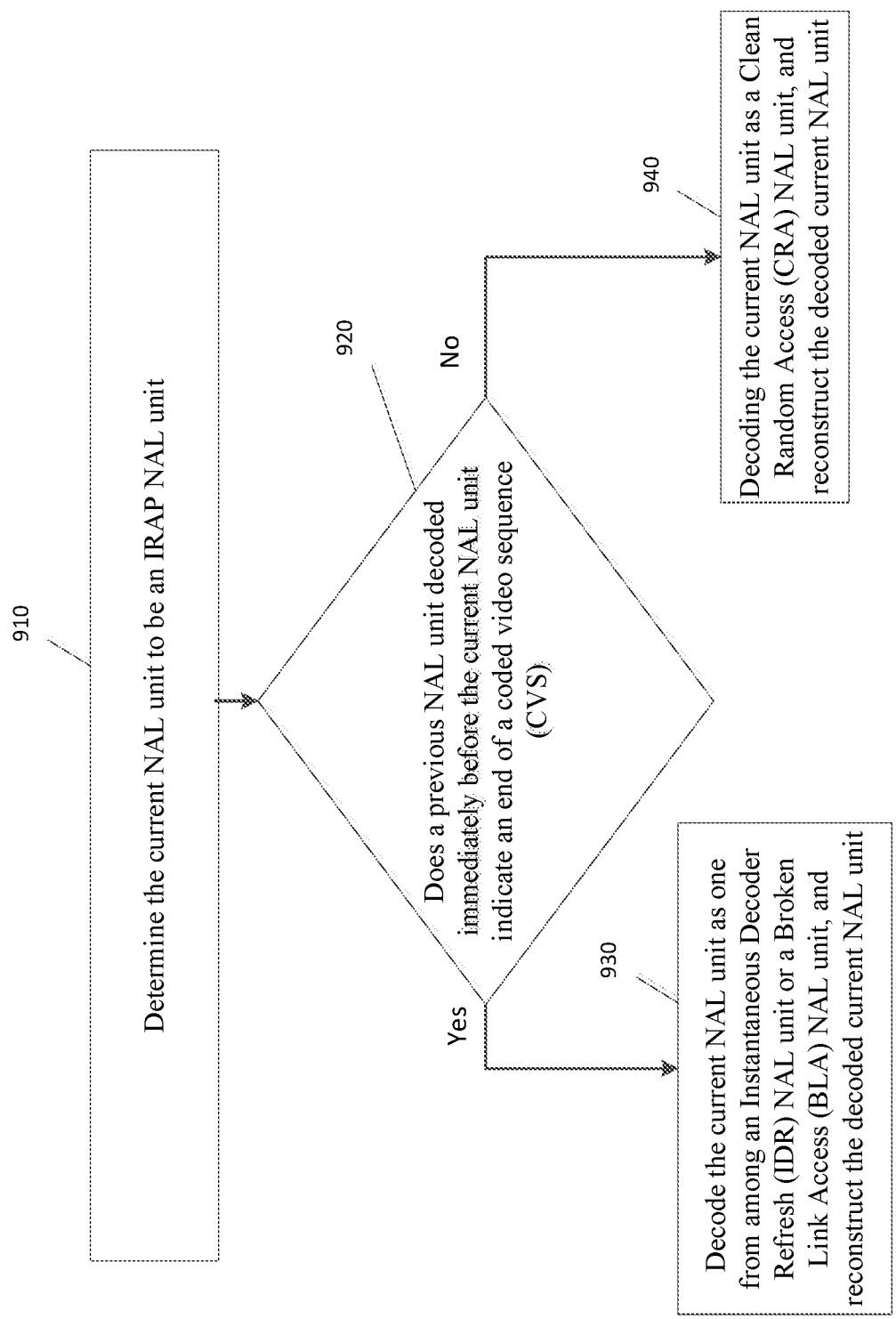
FIG. 9 is a flowchart of an example process for reconstructing a current Network Abstraction Layer (NAL) unit for video decoding according to an embodiment.

FIG. 9 is a flowchart is a flowchart of an example process 900 for reconstructing a current Network Abstraction Layer (NAL) unit for video decoding. In some implementations, one or more process blocks of FIG. 9 may be performed by decoder 310. In some implementations, one or more process blocks of FIG. 9 may be performed by another device or a group of devices separate from or including decoder 310, such as encoder 303.

As shown in FIG. 9, process 900 may include determining the current NAL unit to be an Intra Random Access Picture (IRAP) NAL unit (block~E10).

As further shown in FIG. 9, process 900 may include determining whether a previous NAL unit decoded immediately before the current NAL unit indicates an end of a coded video sequence (CVS) (block 920).

As further shown in FIG. 9, process 900 may include, based on determining that the previous NAL unit indicates the end of the CVS, decoding the current NAL unit as one from among an Instantaneous Decoder Refresh (IDR) NAL unit or a Broken Link Access (BLA) NAL unit and reconstructing the decoded current NAL unit (block 930).

As further shown in FIG. 9, process 900 may include, based on determining that the previous NAL unit does not indicate the end of the CVS, decoding the current NAL unit as a Clean Random Access (CRA) NAL unit, and reconstructing the decoded current NAL unit (block 940).

In an embodiment, process 900 may further include determining whether to decode the current NAL unit as the DR NAL unit or the BLA NAL unit based on a header of the current NAL unit.

In an embodiment, a NAL unit type of the current NAL unit may be an IRAP NAL unit type.

In an embodiment, a NAL unit type of the previous NAL unit may be a CVS End of Stream (EOS) NAL unit type.

In an embodiment, process 900 may further include, based on the determining that the previous NAL unit indicates the end of the CVS, setting a first flag.

In an embodiment, process 900 may further include, based on the first flag being set, processing leading pictures associated with the current NAL unit as Random Access Decodable Leading (RADL) pictures.

In an embodiment, process 900 may further include, based on a NAL unit type of the current NAL unit being a CRA NAL unit type while the first flag is set, setting a second flag.

In an embodiment, process 900 may further include setting the second flag based on an external signal, and setting a third flag corresponding to the second flag.

In an embodiment, process 900 may further include, based on the third flag being set, discarding Random Access Skipped Leading (RASL) pictures associated with the current NAL unit without decoding the RASL pictures.

In an embodiment, process 900 may further include, based on the second flag being set, discarding leading pictures associated with the current NAL unit without decoding the leading pictures.

Although FIG. 9 shows example blocks of process 900, in some implementations, process 900 may include additional blocks, fewer blocks, different blocks, or differently arranged blocks than those depicted in FIG. 9. Additionally, or alternatively, two or more of the blocks of process 900 may be performed in parallel.

Further, the proposed methods may be implemented by processing circuitry (e.g., one or more processors or one or more integrated circuits). In one example, the one or more processors execute a program that is stored in a non-transitory computer-readable medium to perform one or more of the proposed methods.

The techniques for picture reference in network abstraction unit header described above, can be implemented as computer software using computer-readable instructions and physically stored in one or more computer-readable media. For example, FIG. 10 shows a computer system 1000 suitable for implementing certain embodiments of the disclosed subject matter.

The computer software can be coded using any suitable machine code or computer language, that may be subject to assembly, compilation, linking, or like mechanisms to create code comprising instructions that can be executed directly, or through interpretation, micro-code execution, and the like, by computer central processing units (CPUs), Graphics Processing Units (GPUs), and the like.

The instructions can be executed on various types of computers or components thereof, including, for example, personal computers, tablet computers, servers, smartphones, gaming devices, internet of things devices, and the like.

The components shown in FIG. 10 for computer system 1000 are exemplary in nature and are not intended to suggest any limitation as to the scope of use or functionality of the computer software implementing embodiments of the present disclosure. Neither should the configuration of components be interpreted as having any dependency or requirement relating to any one or combination of components illustrated in the exemplary embodiment of a computer system 1000.

Computer system 1000 may include certain human interface input devices. Such a human interface input device may be responsive to input by one or more human users through, for example, tactile input (such as: keystrokes, swipes, data glove movements), audio input (such as: voice, clapping), visual input (such as: gestures), olfactory input (not depicted). The human interface devices can also be used to capture certain media not necessarily directly related to conscious input by a human, such as audio (such as: speech, music, ambient sound), images (such as: scanned images, photographic images obtain from a still image camera), video (such as two-dimensional video, three-dimensional video including stereoscopic video).

Input human interface devices may include one or more of (only one of each depicted): keyboard 1001, mouse 1002, trackpad 1003, touch screen 1010, data-glove 1204, joystick 1005, microphone 1006, scanner 1007, camera 1008.

Computer system 1000 may also include certain human interface output devices. Such human interface output devices may be stimulating the senses of one or more human users through, for example, tactile output, sound, light, and smell/taste. Such human interface output devices may include tactile output devices (for example tactile feedback by the touch-screen 1010, data-glove 1204, or joystick 1005, but there can also be tactile feedback devices that do not serve as input devices), audio output devices (such as: speakers 1009, headphones (not depicted)), visual output devices (such as screens 1010 to include cathode ray tube (CRT) screens, liquid-crystal display (LCD) screens, plasma screens, organic light-emitting diode (OLED) screens, each with or without touch-screen input capability, each with or without tactile feedback capability—some of which may be capable to output two dimensional visual output or more than three dimensional output through means such as stereographic output; virtual-reality glasses (not depicted), holographic displays and smoke tanks (not depicted)), and printers (not depicted).

Computer system 1000 can also include human accessible storage devices and their associated media such as optical media including CD/DVD ROM/RW 1020 with CD/DVD or the like media 1021, thumb-drive 1022, removable hard drive or solid state drive 1023, legacy magnetic media such as tape and floppy disc (not depicted), specialized ROM/ASIC/PLD based devices such as security dongles (not depicted), and the like.

Those skilled in the art should also understand that term "computer readable media" as used in connection with the presently disclosed subject matter does not encompass transmission media, carrier waves, or other transitory signals.

Computer system 1000 can also include interface(s) to one or more communication networks. Networks can for example be wireless, wireline, optical. Networks can further be local, wide-area, metropolitan, vehicular and industrial, real-time, delay-tolerant, and so on. Examples of networks include local area networks such as Ethernet, wireless LANs, cellular networks to include global systems for mobile communications (GSM), third generation (3G), fourth generation (4G), fifth generation (5G), Long-Term Evolution (LTE), and the like, TV wireline or wireless wide area digital networks to include cable TV, satellite TV, and terrestrial broadcast TV, vehicular and industrial to include CANBus, and so forth. Certain networks commonly require external network interface adapters that attached to certain general purpose data ports or peripheral buses (1049) (such as, for example universal serial bus (USB) ports of the computer system 1000; others are commonly integrated into the core of the computer system 1000 by attachment to a system bus as described below (for example Ethernet interface into a PC computer system or cellular network interface into a smartphone computer system). As an example, network 1055 may be connected to peripheral bus 1049 using network interface 1054. Using any of these networks, computer system 1000 can communicate with other entities. Such communication can be uni-directional, receive only (for example, broadcast TV), uni-directional send-only (for example CANbus to certain CANbus devices), or bi-directional, for example to other computer systems using local or wide area digital networks. Certain protocols and protocol stacks can be used on each of those networks and network interfaces as described above.

Aforementioned human interface devices, human-accessible storage devices, and network interfaces can be attached to a core 1040 of the computer system 1000.

The core 1040 can include one or more Central Processing Units (CPU) 1041, Graphics Processing Units (GPU) 1042, specialized programmable processing units in the form of Field Programmable Gate Areas (FPGA) 1043, hardware accelerators for certain tasks 1044, and so forth. These devices, along with Read-only memory (ROM) 1045, Random-access memory (RAM) 1046, internal mass storage such as internal non-user accessible hard drives, solid-state drives (SSDs), and the like 1047, may be connected through a system bus 1248. In some computer systems, the system bus 1248 can be accessible in the form of one or more physical plugs to enable extensions by additional CPUs, GPU, and the like. The peripheral devices can be attached either directly to the core's system bus 1248, or through a peripheral bus 1049. Architectures for a peripheral bus include peripheral component interconnect (PCI), USB, and the like.

CPUs 1041, GPUs 1042, FPGAs 1043, and accelerators 1044 can execute certain instructions that, in combination, can make up the aforementioned computer code. That computer code can be stored in ROM 1045 or RAM 1046. Transitional data can be also be stored in RAM 1046, whereas permanent data can be stored for example, in the internal mass storage 1047. Fast storage and retrieve to any of the memory devices can be enabled through the use of cache memory, that can be closely associated with one or more CPU 1041, GPU 1042, mass storage 1047, ROM 1045, RAM 1046, and the like.

The computer readable media can have computer code thereon for performing various computer-implemented operations. The media and computer code can be those specially designed and constructed for the purposes of the present disclosure, or they can be of the kind well known and available to those having skill in the computer software arts.

As an example and not by way of limitation, the computer system having architecture 1000, and specifically the core 1040 can provide functionality as a result of processor(s) (including CPUs, GPUs, FPGA, accelerators, and the like) executing software embodied in one or more tangible, computer-readable media. Such computer-readable media can be media associated with user-accessible mass storage as introduced above, as well as certain storage of the core 1040 that are of non-transitory nature, such as core-internal mass storage 1047 or ROM 1045. The software implementing various embodiments of the present disclosure can be stored in such devices and executed by core 1040. A computer-readable medium can include one or more memory devices or chips, according to particular needs. The software can cause the core 1040 and specifically the processors therein (including CPU, GPU, FPGA, and the like) to execute particular processes or particular parts of particular processes described herein, including defining data structures stored in RAM 1046 and modifying such data structures according to the processes defined by the software. In addition or as an alternative, the computer system can provide functionality as a result of logic hardwired or otherwise embodied in a circuit (for example: accelerator 1044), which can operate in place of or together with software to execute particular processes or particular parts of particular processes described herein. Reference to software can encompass logic, and vice versa, where appropriate. Reference to a computer-readable media can encompass a circuit (such as an integrated circuit (IC)) storing software for execution, a circuit embodying logic for execution, or both, where appropriate. The present disclosure encompasses any suitable combination of hardware and software.

While this disclosure has described several exemplary embodiments, there are alterations, permutations, and various substitute equivalents, which fall within the scope of the disclosure. It will thus be appreciated that those skilled in the art will be able to devise numerous systems and methods which, although not explicitly shown or described herein, embody the principles of the disclosure and are thus within the spirit and scope thereof

The invention claimed is:

1. A method of reconstructing a current Network Abstraction Layer (NAL) unit for video decoding using at least one processor, the method comprising:
   determining that the current NAL unit is not an intra random access point (IRAP) NAL unit;
   determining that a current picture contained in the current NAL unit is a leading picture;
   obtaining a first flag indicating whether a type of the leading picture is explicitly signaled;
   determining the type of the leading picture based on the first flag;
   decoding the current NAL unit based on the determined type; and
   reconstructing the decoded current NAL unit.

2. The method of claim 1, wherein the current picture is determined to be the leading picture based on a picture order count (POC) value of the current picture and a POC value of an IRAP picture associated with the current picture.

3. The method of claim 2, wherein the current picture is determined to be the leading picture based on the POC value of the current picture being smaller than the POC value of the IRAP picture.

4. The method of claim 1, further comprising:
   based on the first flag indicating that the type of the leading picture is explicitly signaled, obtaining a second flag indicating the type of the leading picture; and
   determining the type of the leading picture based on the second flag,
   wherein the type of the leading picture is at least one of a random access skipped leading (RASL) type and a random access decodable leading (RADL) type.

5. The method of claim 1, further comprising:
   based on the first flag indicating that the type of the leading picture is not explicitly signaled, determining the type of the leading picture based on at least one from among a type of an IRAP picture associated with the current picture, a picture order count (POC) value of the current picture, or reference picture set (RPS) information.

6. The method of claim 5, wherein based on the type of the IRAP picture being a clean random access (CRA) type or a broken link access (BLA) type, the type of the leading picture is determined to be a random access skipped leading (RASL) type.

7. The method of claim 5, wherein based on the type of the IRAP picture being an instantaneous decoder refresh (IDR) type, the type of the leading picture is determined to be a random access decodable leading (RADL) type.

8. A device for reconstructing a current Network Abstraction Layer (NAL) unit for video decoding, the device comprising:
   at least one memory configured to store program code; and
   at least one processor configured to read the program code and operate as instructed by the program code, the program code including:
      first determining code configured to cause the at least one processor to determine that the current NAL unit is not an intra random access point (IRAP) NAL unit;
      second determining code configured to cause the at least one processor to determine that a current picture contained in the current NAL unit is a leading picture;
      first obtaining code configured to cause the at least one processor to obtain a first flag indicating whether a type of the leading picture is explicitly signaled;
      third determining code configured to cause the at least one processor to determine the type of the leading picture based on the first flag;
      decoding code configured to cause the at least one processor to decode the current NAL unit based on the determined type; and
      reconstructing code configured to cause the at least one processor to reconstruct the decoded current NAL unit.

9. The device of claim 8, wherein the current picture is determined to be the leading picture based on a picture order count (POC) value of the current picture and a POC value of an IRAP picture associated with the current picture.

10. The device of claim 9, wherein the current picture is determined to be the leading picture based on the POC value of the current picture being smaller than the POC value of the IRAP picture.

11. The device of claim 8, wherein the program code further includes:
    second obtaining code configured to cause the at least one processor to, based on the first flag indicating that the type of the leading picture is explicitly signaled, obtain a second flag indicating the type of the leading picture; and
    fourth determining code configured to cause the at least one processor to determine the type of the leading picture based on the second flag,
    wherein the type of the leading picture is at least one of a random access skipped leading (RASL) type and a random access decodable leading (RADL) type.

12. The device of claim 8, wherein the program code further includes:
    fifth determining code configured to cause the at least one processor to, based on the first flag indicating that the type of the leading picture is not explicitly signaled, determine the type of the leading picture based on at least one from among a type of an IRAP picture associated with the current picture, a picture order count (POC) value of the current picture, or reference picture set (RPS) information.

13. The device of claim 12, wherein based on the type of the IRAP picture being a clean random access (CRA) type or a broken link access (BLA) type, the type of the leading picture is determined to be a random access skipped leading (RASL) type.

14. The device of claim 12, wherein based on the type of the IRAP picture being an instantaneous decoder refresh (IDR) type, the type of the leading picture is determined to be a random access decodable leading (RADL) type.

15. A non-transitory computer-readable medium storing instructions, the instructions comprising: one or more instructions that, when executed by one or more processors of a device for reconstructing a current Network Abstraction Layer (NAL) unit for video decoding, cause the one or more processors to:
- determine that the current NAL unit is not an intra random access point (IRAP) NAL unit;
- determine that a current picture contained in the current NAL unit is a leading picture;
- obtain a first flag indicating whether a type of the leading picture is explicitly signaled;
- determine the type of the leading picture based on the first flag;
- decode the current NAL unit based on the determined type; and
- reconstruct the decoded current NAL unit.

16. The non-transitory computer-readable medium of claim 15, wherein the current picture is determined to be the leading picture based on a picture order count (POC) value of the current picture and a POC value of an IRAP picture associated with the current picture.

17. The non-transitory computer-readable medium of claim 15, wherein the one or more instructions further cause the one or more processors to:
- based on the first flag indicating that the type of the leading picture is explicitly signaled, obtain a second flag indicating the type of the leading picture; and
- determine the type of the leading picture based on the second flag, wherein the type of the leading picture is at least one of a random access skipped leading (RASL) type and a random access decodable leading (RADL) type.

18. The non-transitory computer-readable medium of claim 15, wherein the one or more instructions further cause the one or more processors to:
- based on the first flag indicating that the type of the leading picture is not explicitly signaled, determine the type of the leading picture based on at least one from among a type of an IRAP picture associated with the current picture, a picture order count (POC) value of the current picture, or reference picture set (RPS) information.

19. The non-transitory computer-readable medium of claim 18, wherein based on the type of the IRAP picture being a clean random access (CRA) type or a broken link access (BLA) type, the type of the leading picture is determined to be a random access skipped leading (RASL) type.

20. The non-transitory computer-readable medium of claim 18, wherein based on the type of the IRAP picture being an instantaneous decoder refresh (IDR) type, the type of the leading picture is determined to be a random access decodable leading (RADL) type.

* * * * *